Figure 1:
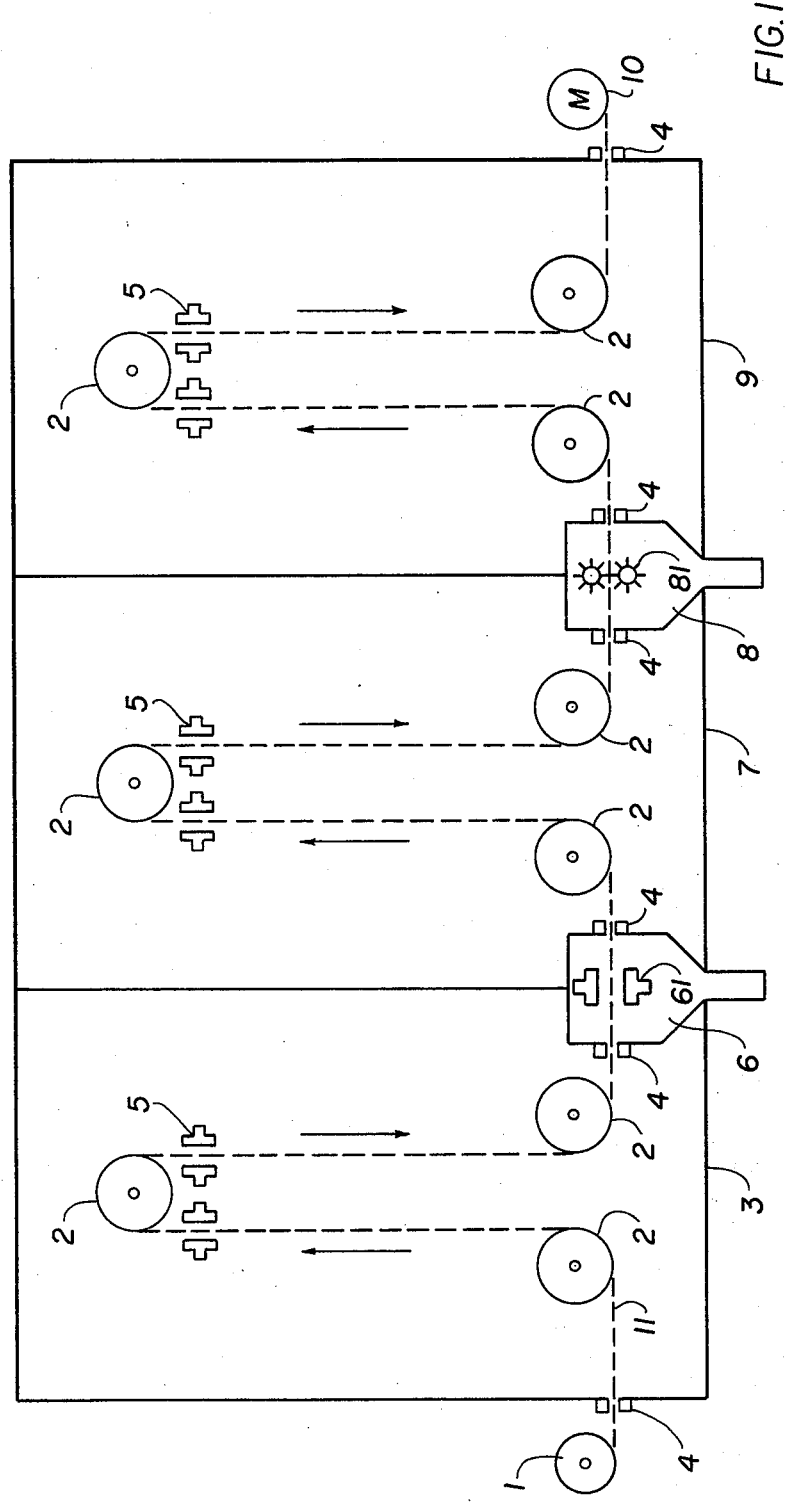

United States Patent [19]
Buder et al.

[11] 3,884,717
[45] May 20, 1975

[54] METHOD AND DEVICE FOR INTRODUCING ACTIVE MASS INTO POROUS ELECTRODE STRUCTURES FOR GALVANIC CELLS

[75] Inventors: Eckart Buder, Kelkheim, Taunus; Wolfgang Knabenbauer, Hagen, both of Germany

[73] Assignee: Varta Batterie Aktiengesellschaft, Hannover, Germany

[22] Filed: Oct. 25, 1973

[21] Appl. No.: 409,600

[30] Foreign Application Priority Data
Oct. 28, 1972 Germany............................ 2253077
Apr. 11, 1973 Germany............................ 2318075

[52] U.S. Cl. ..................................... 136/67; 136/75
[51] Int. Cl. .......................................... H01m 35/18
[58] Field of Search.................. 136/19, 68, 75–76, 136/67, 20, 24, 29, 28, 64, 33–35, 66

[56] References Cited
UNITED STATES PATENTS
| | | | |
|---|---|---|---|
| 2,969,414 | 1/1961 | Fleischer................................ | 136/29 |
| 3,258,362 | 6/1966 | Rampel.................................. | 136/75 |
| 3,281,272 | 10/1966 | Ackermann et al. ............. | 136/67 X |
| 3,442,710 | 5/1969 | Menard.................................. | 136/29 |

Primary Examiner—Anthony Skapars
Attorney, Agent, or Firm—Herbert L. Lerner

[57] ABSTRACT

Method of impregnating porous electrode structures of galvanic cells with active mass wherein the porous electrode structure is saturated with a metal salt solution from which subsequently precipitated compounds of the metal remain in the electrode structure and form the active mass impregnated therein, includes the step of treating the electrode briefly with hot water after it has been saturated with the metal salt solution; and device for carrying out the foregoing invention.

11 Claims, 3 Drawing Figures

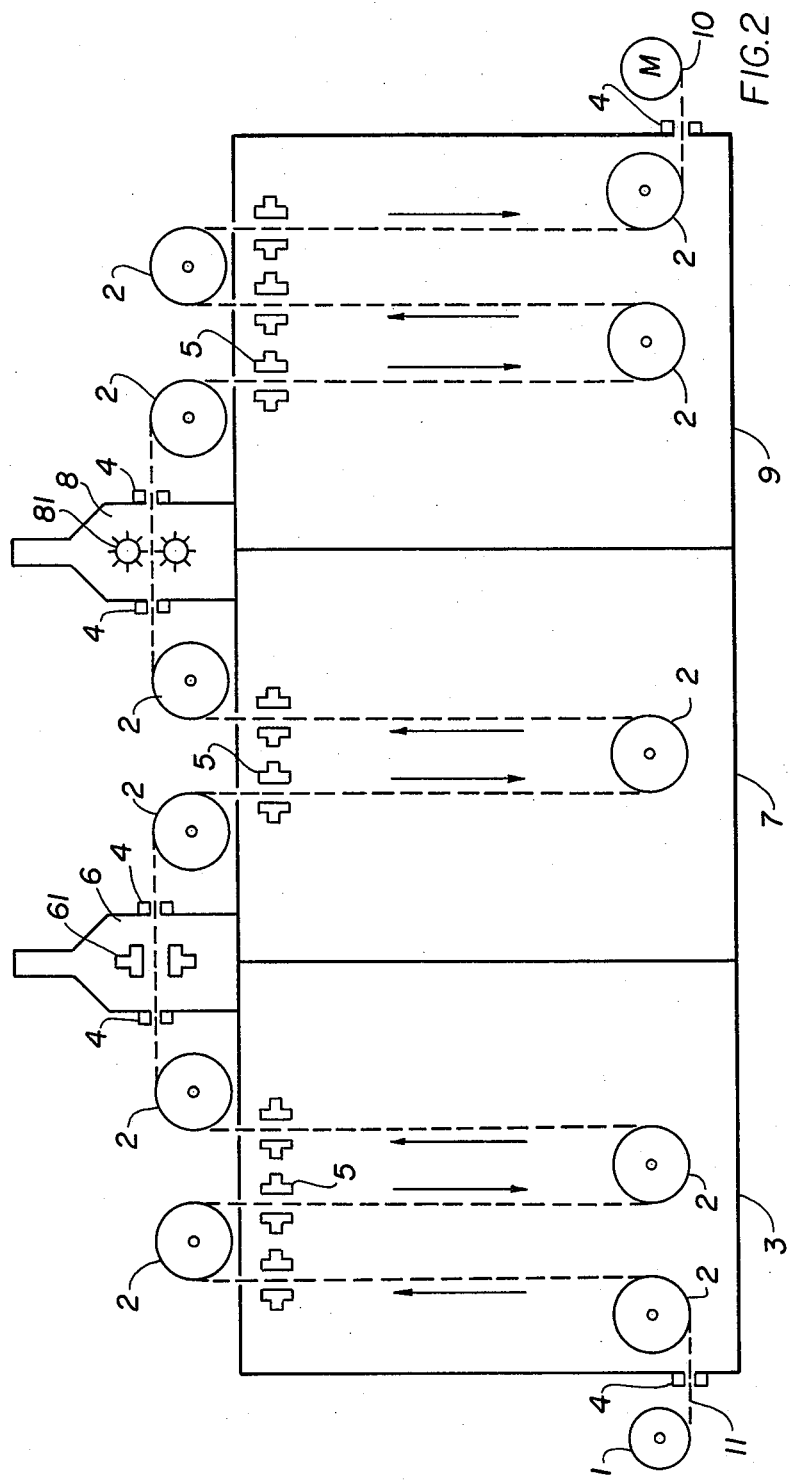
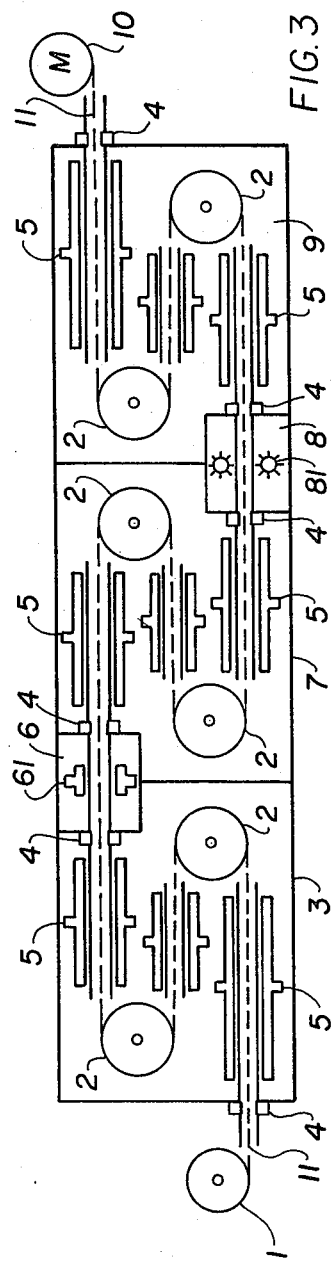

METHOD AND DEVICE FOR INTRODUCING ACTIVE MASS INTO POROUS ELECTRODE STRUCTURES FOR GALVANIC CELLS

The invention relates to a method and device for introducing active mass into porous electrode structures for galvanic cells, particularly for alkaline accumulators, by impregnating the porous electrode structures with a metal salt solution from which the metal compound forming the active mass remain in the porous electrode structures after precipitation has occurred and wherein the electrode is briefly treated with hot water after having been impregnated by the metal salt solution.

Saturation or soaking methods are generally used for impregnating porous electrode structures, in particular sinter electrodes of alkaline accumulators, with active masses. In these known processes, the nickel sinter structures are often repeatedly impregnated with solutions of simple metal salts at raised temperatures with the aid of under- or super pressure, a drying process following each impregnation. The metal salt fixed thereby is converted into the respective metal oxide or -hydroxide by being treated with lyes of strong concentration into which the electrodes are dipped. The anions of organic and inorganic acids remaining in the active mass and in the electrode structure have to be removed, since their presence would cause disturbances during the operation of the electrodes. Therefore, after each saturation or impregnation or, at least after the electrode structure has been impregnated with the necessary amount of active mass, the anions have to be removed either by washing with water or by electrical polarization demanding much time and energy.

Efforts have further been made to treat the electrode structures with the fused salts of the metals provided for forming the active mass, however no progress of any substance, compared to the aforementioned method, can be achieved thereby. Also, it is not possible by this procedure to remove the anions any more easily.

All conventional saturation or impregnation methods have the great disadvantage that the usual method steps, such as immersion or impregnation, drying, precipitation, and washing operations etc., that are separated with respect to time and space, require much time and are very costly, particularly because only little active mass is fixed in the pores during the operation step of saturation or impregnation and, therefore, a large number of cycles is necessary. Since each cycle requires two drying operations, this step of the procedure has an especially marked effect.

A proposal has also been made heretofore to introduce the active mass from acid or alkaline solutions of the nitrates of the metals forming the active mass, in the form of hydroxides thereof, into sinter structures by continuous electrolytic methods. It has been found, however, in these methods that not enough active mass can be applied during a single electrolytic treatment, so that then also, the method steps have to be repeated often after the intermediate drying operations.

In German Published Non-Prosecuted Application DOS 2032699, in order to facilitate and accelerate considerably the impregnation of porous electrode structures with active mass, it has been proposed to sprinkle the metal salt solution continuously on one side of a tape or strip-shaped electrode structure and to adduct the solvent and volatile reaction products or reaction product developing during the precipitation from the other side of the tape or strip. According to the device which is described in the aforementioned German Published Application, the constantly heated tape-shaped electrode structure is passed below the serially assembled sprinkling sections or lengths which are arranged as impregnation or saturation, precipitation and washing sections in that order and which can be repeated as often as desired. If necessary, drying sections or lengths can be located additionally among the other sections. On the underside of the electrode strip or tape, the reaction products and the rinsing or wash water, respectively, are adducted by an air stream.

Such a device is not suitable for performing the method of the invention of the instant application, wherein the impregnation is effected by diffusion, because the electrolyte diffusion near the surface is sharply diminished due to incrustation of the pores at the surface. This known device requires considerable space, since the strip or tape-shaped horizontally disposed electrode structure is passed through sprinkle sections or lengths, which are assembled serially in one line.

It is accordingly an object of the invention to provide a method of introducing active mass into porous electrode structures of galvanic cells which avoids aforementioned disadvantages of the heretofore known methods of this general type, and which more specifically facilitates and accelerates the impregnation of porous electrode structures with active masses as compared with the conventional methods.

It is a further object of the invention to provide a device for carrying out the method of impregnating electrode structures of galvanic cells with active mass, which makes possible the introduction of the active mass by diffusion, at a constant runthrough velocity of the electrode strip or tape, wherein the required working space is relatively small compared to that required for heretofore known devices of this general type.

With the foregoing and other objects in view, there is provided in accordance with the invention, a method of impregnating porous electrode structures of galvanic cells with active mass wherein the porous electrode structure is saturated with a metal salt solution from which subsequently precipitated compounds of the metal remain in the electrode structure and from the active mass impregnated therein, which includes the step of treating the electrode briefly with hot water after it has been saturated with the metal salt solution.

Such a treatment with hot water or quick rinsing of the electrode or electrode tape or strip, respectively, is effected after each impregnating or saturation step before the metal compounds are precipitated with lye. The heretofore conventional intermediate drying step, can therefore be omitted.

In accordance with other features of the invention, the temperature of the rinsing water is at about 60° to 90°C, and the rinsing time is between 2 to 10 seconds and preferably 5 seconds at which the sprinkling operation is especially favorable.

In accordance with the device invention of the instant application, there is provided a device for carrying out the method of impregnating porous electrode structures of galvanic cells with active mass, wherein the porous electrode structure is saturated with a metal salt solution from which subsequently precipitated compounds of the metal remain in the electrode structure and from the active mass impregnated therein; and wherein the electrode structure is briefly treated with hot water after it has been saturated with the metal salt solution, comprising separate chambers including a first chamber for saturating the electrode structure with metal salt solution, a second chamber for saturating the electrode structure with precipitation solution, and a third chamber for treating the electrode structure with wash solution, double-sided sprinkler devices mounted in the chambers, a rinsing chamber located between the first and second chambers, a double-sided flat jet nozzle located in the rinsing chamber, and means comprising a system of reversing rollers for passing an electrode structure in the form of a tape through the chambers.

In accordance with another feature of the invention, a cleaning chamber 1 containing a pair of revolving brushes, is located between the precipitating chamber and the washing chamber.

In accordance with a further feature of the invention, the chambers for treatment with impregnating or saturating, precipitating and washing solution, as well as the rinsing and cleaning chambers are provided with skimming or wiper devices located at openings in the chamber walls through which the tape or strip-shaped electrode structure is passed through the chambers.

In accordance with an additional feature of the invention, the rollers have rotary axes disposed horizontally.

In accordance with an added feature of the invention, pairs of rollers are located in a lower part of each of the first, second and third chambers, respectively, and one of the rollers in an upper part of each of the first, second and third chambers, respectively, the rinsing chamber and the cleaning chamber being located at the same level as the pairs of rollers.

In accordance with another embodiment of the device of the invention, pairs of the rollers, respectively, and the rinsing and cleaning chambers are located above the first, second and third chambers.

In accordance with a concomitant feature of the invention, the rollers have vertically disposed rotary axes, and each of the first, second and third chambers, respectively, contain at least two of the rollers.

Through the method of the invention the conventional drying step between impregnation or saturation with the metal salt solution and the precipitation of the active mass, as well as the conventional drying step after the rinsing operation can be omitted. In this rhythmically operating method, the slowest step determines the total flow rate, so that with conventional methods the total flow rate is determined essentially by the time-consuming drying process.

In contrast to heretofore known methods, with the method invention of the instant application, it is possible to obtain a virtually continuous production method. For example, a foil of sinter structure can be caused to pass by jet nozzles, which sprinkle all necessary solutions onto the foil. The shape of these nozzles and their disposition are selected so that a sprinkle film can develop on the surface of the foil and run down thereon. The supplied solution per se can be collected in one reservoir or supply vessel, and brought to the required temperature and concentration, and can serve for several devices arranged in parallel. Thereby, a considerably smaller volume of liquid is required than by drawing the foil through a bath of the liquid. To obtain sufficient mass conversion and electrolyte diffusion near the surface, the pores must remain opened and, in accordance with the invention, the foil is sprinkled on both sides thereof with hot water immediately after being impregnated with nickel — or cadmium salt. The duration of the sprinkling operation can be precisely determined, for example, by spatially limiting the length of the sprinkling apparatus along which the sinter foil tape, which passes through this apparatus with constant velocity, is sprinkled. Revolving brushes or an air stream, for example, can be provided to limit the sprinkling to a predetermined length of the tape or strip. A dilution of the nickel or cadmium salt solution or a free-rinsing of the pores near the surface is produced within the sprinkling zone. The degree of dilution can be accurately determined by the sprinkling time. A duration of 2 to 10 seconds has proven to be favorable. It is further possible, in such a device, to dispose brushes between the locations at which the precipitation — and subsequent washing operations occur, the brushes rotating in opposite direction to the direction of feed of the strip. By this method a major amount of precipitating agent is wiped or stripped from the surface, so that the washing process can also be considerably shortened. With the aforementioned modes of the method of the invention, the duration of the impregnation process can be shortened considerably and controlled within wide limits, so that a product of high quality can be formed.

In the article by D. W. Wabner, C. Kandler, and W. Krienke: "Beitrag zur Kenntnis der positiven Elektrode von Nickel-Cadmium Batterien" of "Metalloberflaeche - Angewandte Elektrochemie", 26, 1972, Book 2, page 68 to 74, for example, it is stated that to impregnate an electrode of 1,1 mm thickness (carrier 0,25 mm, perforation about 50%) with 6.23 g Ni $(OH)_2/cm^2$, including a subsequent cathodic treatment, 9 hours are required. The Ni $(OH)_2$ quantity has been calculated from the given surface capacity of 1,65 $Ah/dm^2$ over a mean capacity or 265 m Ah/g Ni $(OH)_2$. The Ni $(OH)_2$ quantity per ml as initial pore volume is 0.92 g Ni $(OH)_2$.

For the same quantity (7.35 g Ni $(OH)_2$) at an electrode thickness of 1.1 mm, 2.15 hours are required for 3 cycles according to the proposed method. The amount of Ni $(OH)_2$ per ml of initial pore volume is in this case 1.08 g. To fill an electrode with 11.3 g Ni $(OH)_2$, 5.6 hours are required for 8 cycles. The amount of Ni $(OH)_2$/ml of initial pore volume is 2.02 g.

The time, which is saved in impregnating an equal amount of Ni $(OH)_2$ per unit area is considerable, as the test results show.

The object of this impregnation method is to introduce active mass to an optimum quantity in as continuous a manner as possible into a sinter body. It is very important for the elelctrochemical utility that the remaining pore volume be not concentrated in a few areas of the limited size.

If the impregnation process is started with a dry electrode or, in the course of the impregnation cycle, after an intermediate drying step, the process is continued with the dry, partly filled electrode, the speed of immersion of the electrodes into the impregnation or saturation solution or the supply of impregnating or saturating solution depends upon the extent to which the electrode is filled.

In a continuously performed process, the speed or the duration are determined by the quantity of active mass, which is to be introduced in the last impregnation step, if the driving force for the introduction of the mass is capillary action. The determining factor is the flow resistance, which is a function of the pore radius, which decreases in the course of the individual impregnation cycles.

In the method of the invention of the instant application, wherein no drying steps are provided, the impregnation is effected by diffusion. The active mass is introduced by diffusion at constant flow velocity at the level of the starting velocity as a result of the concentration differential at the surface of the electrode. No reduction of the diffusion due to diminuation of pore radius which occurs, has been observed following the tests.

By the omission of the drying steps, in addition to a qualitative improvement of the electrode, the entire procedure can be performed more quickly. Since the electrode surfaces need no longer be cleaned, further cleaning steps may be dispensed with.

Another advantage of the method according to the invention especially with respect to the electrolytic process, is that it is easily possible to introduce additives together with the active mass, particularly so-called antipolar masses, for example.

Other features which are considered as characteristic for the invention are set forth in the appended claims.

Although the invention is illustrated and described herein as method and device for introducing active mass into porous electrode structures for galvanic cells, it is nevertheless not intended to be limited to the details shown, since various modifications may be made therein without departing from the spirit of the invention and within the scope and range of equivalents of the claims.

The invention, however, together with additional objects and advantages thereof, will be best understood from the following description when read in connection with the accompanying drawing, in which:

FIGS. 1 and 2 are diagrammatic side elevational views of two different embodiments of the invention wherein the rollers or pulleys thereof are disposed so that the rotary axes thereof extends horizontally and the electrode structure tape or strip is fed in horizontally; and FIG. 3 is a diagrammatic top plan view of another embodiment wherein the rotary axes of the rollers extend vertically and the tape or strip is fed in vertically.

Referring now to the drawing and first, particularly, to FIG. 1 thereof, there is shown therein a raw sinter strip or tape of electrode structure 11, which runs from a supply coil 1 into chamber 3 containing metal salt solution. The strip or tape-shaped electrode structure 11 is deflected in travel direction over three rollers or pulleys 2 and sprayed or sprinkled with solutions from jet nozzles 5 so as to be impregnated with active mass; suitable metal salt solutions have been mentioned hereinbefore with respect to the method of the invention. Between the chamber 3 for the metal salt solution and a chamber 7 for precipitating solution, such as lye, a washing chamber 6 is provided, which is closed from the other chambers by wiper or stripping devices 4. The tape or strip-shaped electrode structure 11, passing the washing chamber 6, which contains a double-sided flat jet nozzle 61, is sprinkled or sprayed with hot water on both sides thereof. A defined adjustable sprinkling zone is assured by means of the flat jet nozzle 61. The dripping time can be shortened and, simultaneously, a perfunctory or initial cleaning of the electrode structure attained. The tape or strip 11 is passed over three rollers or sheave pulleys 2 in the chamber 7 and precipitating solution is sprinkled on the tape sinter material with the aid of double-sided sprinkler or spray devices 5. Thereafter, the strip or tape 11 is introduced through skimming or wiping devices 4 into a washing chamber 9. The tape or strip 11 is deflected or reversed in direction again over three rollers or pulleys 2 in the washing chamber 9, and is sprayed or sprinkled with hot water by double-sided sprinkler devices 5. The strip or tape 11 is conducted from the washing chamber 9 over a further skimming or stripping device 4 and wound onto a roll 10.

According to the invention, a cleaning chamber 8, in which a pair of revolving brushes 81 are mounted, is located between the precipitating chamber 7 and the washing chamber 9, to remove the lye and any possibly adhering film of the active mass, from the electrode strip or tape 11. This feature is not absolutely required, but has salutory effects toward reducing the length of the washing section in the washing chamber 9.

In the embodiment according to FIG. 2, the upper rollers or sheave pulleys 2 are located above the chambers 3, 7 and 9. The washing chamber 6 and the cleaning chamber 8, that may be provided, are also located above and outside of the chambers 3, 7 and 9. As to the travel direction of the tape or strip 11, however, the chambers 6 and 8 are always located intermediate the chambers, respectively.

The sinter structure 11 is passed through the chambers 6 and 8 over two other rollers or pulleys 2, which are located outside of and above the chambers 3, 7 and 9.

In the embodiment of FIG. 3, according to the invention, the tape or strip-shaped sinter structure 11 is conducted in upright position, i.e. all of the axes of the rollers or pulleys 2, the supply coil 1, and the take-up coil 10 extend vertically. The sinter structure 11 is deflected in each of the three chambers 3, 7 and 9 over two rollers or pulleys 2 and sprayed or sprinkled by double-sided sprinkler devices 5. Behind or downstream of the chamber 3 for the metal salt solution and in front or upstream of the precipitation chamber 7 in the travel direction of the tape or strip 11, another washing chamber 6 is provided, in which a double-sided flat jet nozzle 61 is mounted. Between the precipitating and washing chambers 7 and 9, respectively, the chamber 8, which serves as a cleaning chamber, is provided with a pair of revolving brushes 81.

The diameter of the rollers or sheave pulleys 2 of the device according to the invention, is between 15 to 40 cm long.

In practice, several of the devices of the invention are disposed in series arrangement to ensure a sufficient impregnation of active mass.

The most important advantage of the embodiments of the device of the invention of the instant application shown in FIGS. 1 and 2 is that these embodiments require relatively minimal space. The embodiment of the device shown in FIG. 2 is especially advantageous, because sealing against the ambient corrosive medium at the roller bearings located above the chambers, as well as sealing of the passage openings for the tape or strip in the walls of these chambers, can then be omitted.

Another advantage of the embodiment of the device invention of the instant application shown in FIG. 3 is the reduced number of rollers or pulleys that are required.

The method of the invention ca be performed continuously with a minimal requirement of space, time and work by the device of the invention.

We claim:

1. In a method of impregnating porous electrode structures of galvanic cells with active mass wherein the porous electrode structure is saturated with a metal salt solution from which, subsequently precipitated compounds of the metal remain in the electrode structure, the step of treating the electrode briefly with hot water after it has been saturated with the metal salt solution but before the metal compounds are precipitated.

2. In the method of claim 1, wherein a plurality of impregnating steps are repeated on the electrode structure, the steps of treating the electrode with hot water after each impregnating step.

3. In the method of claim 1, wherein the hot water treatment comprises sprinkling the electrode structure with rinsing water having a temperature of 60° to 90°C.

4. In the method of claim 1, wherein the hot water treatment comprises sprinkling hot water on the electrode structure for a period of 2 to 10 seconds.

5. Device for carrying out the method of impregnating porous electrode structures of galvanic cells with active mass according to claim 1 wherein the porous electrode structure is saturated with a metal salt solution from which subsequently precipitated compounds of the metal remain in the electrode structure, and wherein the electrode structure is briefly treated with hot water after it has been saturated with the metal salt solution, comprising separate chambers including a first chamber for saturating the electrode structure with metal salt solution, a second chamber for saturating the electrode structure with precipitation solution, and a third chamber for treating the electrode structure with wash solution, double-sided sprinkler devices mounted in said chambers, a rinsing chamber located between said first and second chamber, a double-sided flat jet nozzle located in said rinsing chamber, and means comprising a system of reversing rollers for passing an electrode structure in the form of a tape through said chambers.

6. Device according to claim 5 including passage means formed in walls of said chambers for providing passage of the tape-shaped electrode structure therethrough, and wiper means located adjacent said passage means.

7. Device according to claim 5 wherein said rollers have rotary axes disposed in a horizontal plane.

8. Device according to claim 5 wherein said rollers have vertically disposed rotary axes, and each of said first, second and third chambers, respectively, contain at least two of said rollers.

9. Device according to claim 5 including a cleaning chamber located between said second and said third chambers, and a plurality of rotary brushes mounted in said cleaning chamber.

10. Device according to claim 9, wherein pairs of said rollers are located in a lower part of each of said first, second and third chambers, respectively, and one of said rollers in an upper part of each of said first, second and third chambers, respectively, said rinsing chamber and said cleaning chamber being located at the same level as said pairs of rollers.

11. Device according to claim 9, wherein pairs of said rollers, respectively, and said rinsing and cleaning chambers are located above said first, second and third chambers.

* * * * *